Inventors
Albert Norman Bland
David Aubrey Davies
By Stevens Davis Miller + Mosher
Attorneys

Fig. 7.

Inventors
Albert Norman Bland
David Aubrey Davies
By Stevens, Davis, Miller & Mosher
Attorneys April 2, 1963   A. N. BLAND ETAL   3,083,804
CLUTCH OPERATING MECHANISM FOR VEHICLES
Filed Sept. 7, 1960   10 Sheets-Sheet 10

Inventors
Albert Norman Bland
David Aubrey Davies
By Stevens Davis Miller + Mosher
Attorneys

United States Patent Office 3,083,804
Patented Apr. 2, 1963

3,083,804
CLUTCH OPERATING MECHANISM
FOR VEHICLES
Albert Norman Bland and David Aubrey Davies, Leamington Spa, England, assignors to Automotive Products Company Limited, Leamington Spa, England
Filed Sept. 7, 1960, Ser. No. 54,399
Claims priority, application Great Britain Sept. 23, 1959
4 Claims. (Cl. 192—91)

This invention relates to control systems for friction clutches of the kind in which the effort necessary to disengage a friction clutch against the load of springs or other engaging means is produced by creating, in a servo-motor comprising a casing divided into two chambers by a diaphragm or piston, an air pressure differential on opposite sides of the said diaphragm or piston to produce relative movement between them, the casing or the diaphragm or piston being held in a fixed position and the other of them being coupled to a clutch throw-out fork or equivalent member.

The air pressure differential may be produced by applying suction to one of two chambers on opposite sides of the movable member which are both normally connected to the atmosphere, by admitting atmospheric air to one of two such chambers which are both normally kept at a sub-atmospheric pressure, or by admitting compressed air to one of two such chambers both of which are normally at atmospheric pressure.

According to the present invention, in a control system of the kind referred to for a friction clutch the pressure in the chamber on one side of the diaphragm or piston of the servo-motor is controlled by a control valve arranged in a conduit connecting that chamber to a source of air pressure or suction, the said valve being operative to connect the said chamber alternatively to said source or to the atmosphere and being so arranged that the pressure differential acting in the servo-motor is substantially proportional to the movement of the pedal or equivalent member by which the control valve is operated.

Further, according to the invention, in a control system of the kind referred to for a friction clutch a pedal or equivalent operating member is connected to the clutch throw-out fork through a mechanical linkage or a liquid pressure transmission system, the pressure on one side of the diaphragm or piston of the servo-motor being controlled by a control valve arranged in a conduit connecting that chamber to a source of air pressure or suction, the said control valve, which is operative to connect said chamber alternatively to said source or to the atmosphere, being responsive to load applied to said linkage or transmission system to disengage the clutch and being so arranged that the pressure differential acting in the servo-motor is substantially proportional to the movement of the pedal or equivalent member.

The invention is hereinafter described with reference to the accompanying diagrammatic drawings, in which:

FIGURE 7 shows a clutch control system similar to that shown in FIGURE 6 but in which a part of the mechanical connection is replaced by a liquid pressure connection;

In each figure of the drawings, the clutch is indicated by the reference 11 and the clutch release bearing by the reference 12, the clutch operating pedal being shown at 13 and the throw-out lever which acts on the release bearing at 14.

Figure 1:
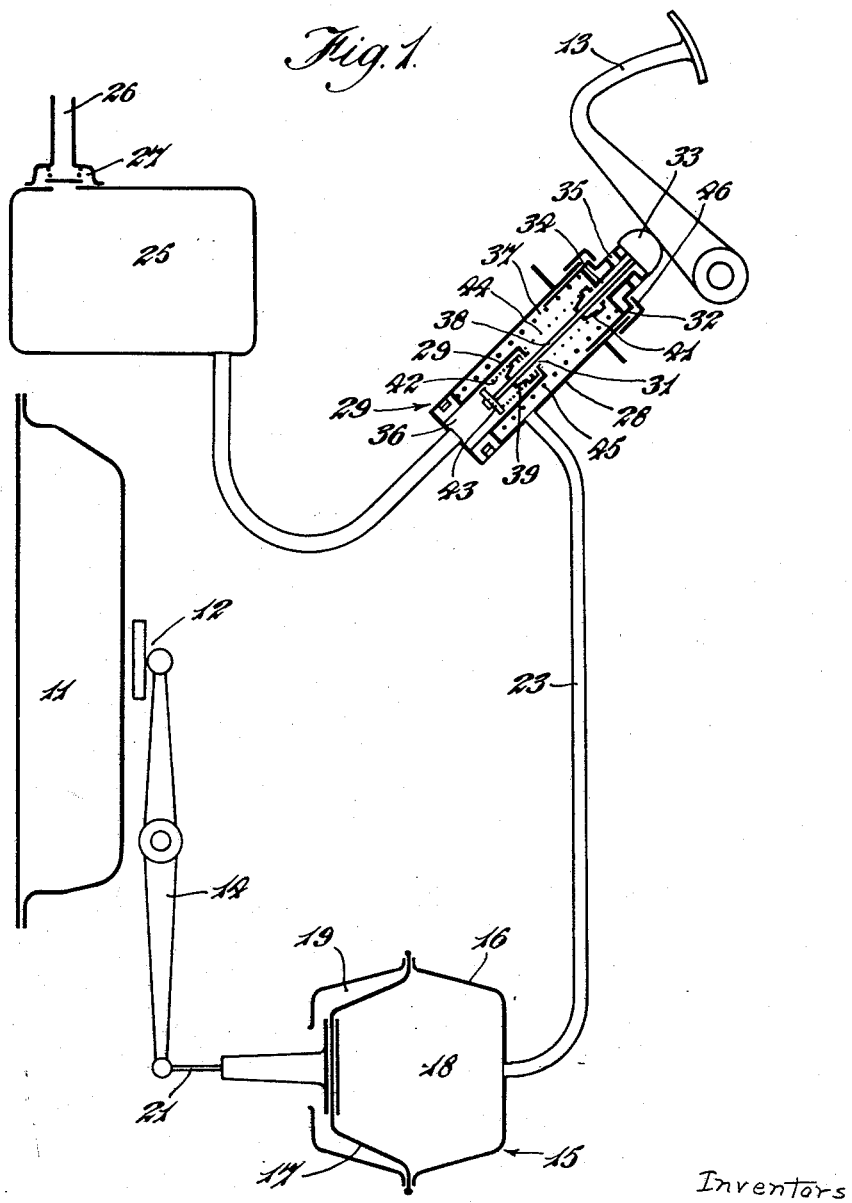
FIGURE 1 shows a clutch control system including a vacuum servo-motor and having no mechanical or liquid pressure connection between the clutch operating pedal and the clutch release bearing.

Referring to FIGURE 1, a vacuum servo-motor 15 includes a casing 16 mounted in a fixed position in a vehicle (not shown) the casing being divided by a flexible diaphragm 17 into two chambers 18 and 19. A pull rod 21 fixed to the centre of the diaphragm 17 is connected to the throw-out lever 14. The chamber 19 of the servo-motor is open to the atmosphere, and the chamber 18 which constitutes the working chamber, is connected by a conduit 23 to a control valve 24 actuated by the pedal 13 to connect the said working chamber 18 alternatively to a vacuum reservoir 25 or to the atmosphere. The vacuum reservoir 25 is connected at 26 to the inlet manifold, not shown, of the vehicle engine, a non-return valve 27 being provided to maintain vacuum in the reservoir 25 when the engine is stopped or the depression in the manifold is low. It will be appreciated that, if the vehicle has a compression ignition engine, an exhauster may be provided to maintain low pressure in the reservoir 25.

The valve 24 comprises a cylindrical body 28 in one end of which is fixed a cylindrical sleeve 29 having at its inner end an internal flange surrounding an orifice 31. A piston 32 slidable in the body 28 has integral with it a co-axial projection 33 engaged by the pedal 13, a central passage 34 in the piston communicating with the atmosphere through transverse openings 35 in the projection 33. Thus a chamber 36 is formed between one end of the body 28 and the sleeve 29, and a second chamber 37 is formed between the sleeve 29 and the piston 32. The chamber 36 is connected to the vacuum reservoir and the chamber 37 is connected by the conduit 23 to the working chamber 18 of the servo-motor 15. A stem 38 fixed to the piston 32 and extending through the orifice 31 has slidably mounted on it two valve closure members 39 and 41 arranged to control respectively the orifice 31 and the passage 34, the valve closure member 39 being acted on by a spring 42 taking its abutment on a washer 43 fixed to the stem 38, and the valve closure member 41 being acted on by a spring 44 taking its abutment on the flange of the sleeve 29. The piston 32 is urged outwardly by a spring 45. When the clutch pedal 13 is free, the spring 45 holds the piston 32 against a stop ring 46, the valve closure member 39 being held seated around the orifice 31 by the spring 42, which is in a compressed condition, and the spring 44 is fully extended, so that the valve closure member 41 is free to move away from the passage 34, allowing free admission of atmospheric air to the working chamber 18 of the servo-motor. Pressure on the pedal 13 moves the piston 32 and, with it, the stem 38, so that the valve closure member 41 seats around the passage 34 and the spring 44 is progressively compressed whilst the spring 42 is progressively extended, reducing the closing force on the valve closure member 39. Thus the spring loading on the closure member 39 is reduced until the pressure differential across it is sufficient to move it away from its seat and suction is then applied to the working chamber 18 of the servo-motor 15 to disengage the clutch. At any degree of depression of the pedal 13, there is a corresponding degree of extension of the spring 42, and the valve closure member 39 tends to seat when the pressure differential balances the spring load, so that the pressure differential acting in the servo-motor is substantially proportional to the pedal movement. When the pedal is released, the spring 42 is re-compressed and the spring 44 is extended, so that the valve closure members return to their initial positions and the clutch is re-engaged.

Figure 2:
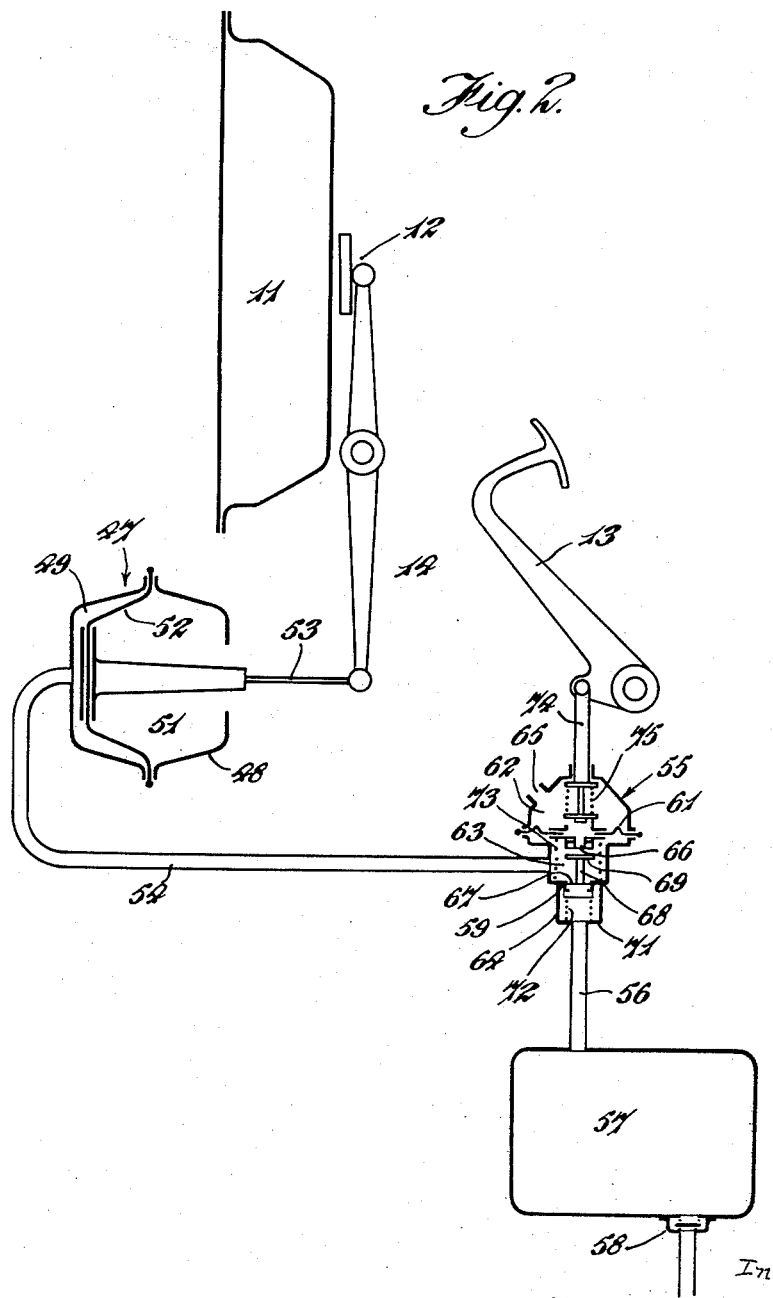
FIGURE 2 shows a clutch control system including an air pressure servo-motor and having no mechanical or liquid pressure connection between the clutch operating pedal and the clutch release bearing.

In the system shown in FIGURE 2, a servo-motor 47 comprising a casing 48 divided into two chambers 49 and 51 by a flexible diaphragm 52 has the centre of the said diaphragm connected by a thrust rod 53 to the throw-out lever 14. The chamber 51 is open to the atmosphere, and the chamber 49, which is the working chamber, is connected by a conduit 54 to a control valve 55 operated by the pedal 13, the control valve 55 being connected by a conduit 56 to a compressed air reservoir 57, pressure in which is maintained by a compressor (not shown) supplying air to the reservoir through a non-return valve 58.

The control valve 55 comprises a casing divided by a rigid partition 59 and a flexible diaphragm 61 into three chambers 62, 63 and 64, the chamber 62 being connected to the atmosphere at 65, the chamber 63 being connected by the conduit 54 to the working chamber 49 of the servo-motor, and the chamber 64 being connected by the conduit 56 to the compressed air reservoir 57. Orifices 66 and 67 are provided in the diaphragm 61 and in the partition 59 respectively, and a valve member 68 having heads 69 and 71 in the chambers 63 and 64 respectively, controls the said orifices. The valve member 68 is urged to the position shown in the drawing, in which the head 71 closes the orifice 67, by a spring 72, and the diaphragm 61 is urged towards the chamber 62 by a spring 73 so as to urge it away from the head 69 and open the orifice 66. The diaphragm 61 is coupled to the pedal 13 by a push rod 74 and a pre-loaded spring 75, so that thrust on the pedal 13 tends to urge the diaphragm 61 towards the valve member 68.

As can be seen in the drawing, when the pedal 13 is free the working chamber 49 of the servo-motor is connected to the atmosphere through the orifice 66 in the diaphragm, so that the servo-motor is inoperative. When the pedal is depressed, the diaphragm 61 moves towards the valve member 68 until the head 69 closes the orifice 66, and the valve member 68 is then moved to open the orifice 67 and admit compressed air to the working chamber 49 of the servo-motor and disengage the clutch. Pressure built up in the said working chamber also acts on the diaphragm 61 against the pre-loaded spring 75, tending to re-seat the valve head 71, so that the pressure differential built up in the servo-motor depends on the compression of the spring 75. Since the compression of that spring depends on the movement of the pedal the pressure differential built up in the servo-motor is substantially proportional to the pedal movement.

When the pedal is released, the diaphragm 61 moves away from the valve member 68, and the parts are restored to the position shown in FIGURE 2, so that the clutch is re-engaged.

Figure 3:
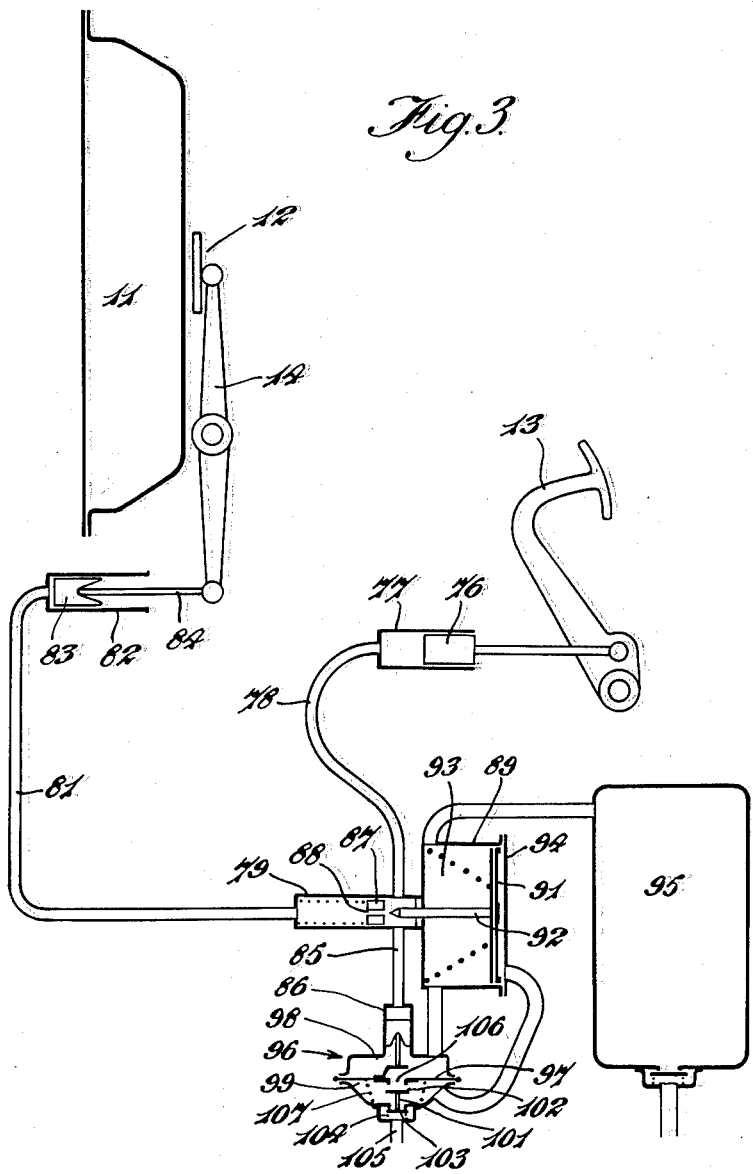
FIGURE 3 shows a clutch control system including a vacuum servo-motor and having a liquid pressure connection between the clutch pedal and the clutch release bearing.
Figure 4:
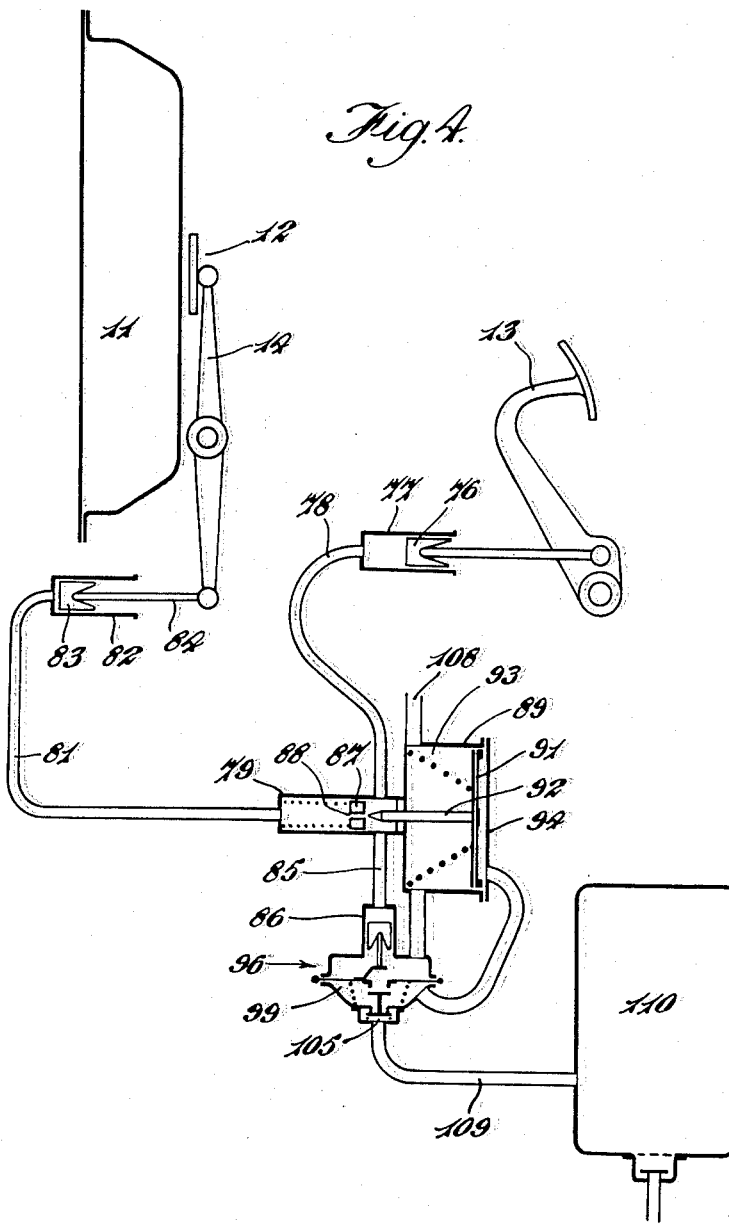
FIGURE 4 shows a clutch control system similar to that shown in FIGURE 3 but including an air pressure servo-motor.

The systems shown in FIGURES 3 and 4 have a number of features in common, the difference between them being that the servo-motor in FIGURE 3 is vacuum-operated and the servo-motor in FIGURE 4 is compressed air operated.

In both systems the clutch pedal 13 actuates the piston 76 of a liquid pressure master cylinder 77 connected by a conduit 78 to a servo-operated master cylinder 79 which is in turn connected by a conduit 81 to a motor cylinder 82 the piston 83 of which acts through a push rod 84 on the throw-out lever 14. The master cylinder 79 is also connected by a conduit 85 to a valve-operating motor cylinder 86. The piston 87 of the servo-operated master cylinder 79 has a passage 88 therein through which the conduits 78 and 81 communicate one with the other, the servo-motor 89 having a piston 91 to which is attached a thrust rod 92 which, when the servo-motor is operated, closes the passage 88 and applies thrust to the piston 87.

In the system shown in FIGURE 3, the servo-motor 89 is of the vacuum-suspended type, in which the chambers 93 and 94 on opposite sides of the piston are both normally connected to a vacuum reservoir 95, the working chamber 94 being connected by the control valve 96 to the atmosphere when the servo-motor is operated. As shown in FIGURE 3, the control valve 96 comprises a body divided by a flexible diaphragm 97 into two chambers 98 and 99, the chamber 98 being connected permanently to the chamber 93 of the servo-motor, which is in turn connected to the vacuum reservoir 95. The valve chamber 99 is permanently connected to the working chamber 94 of the servo-motor. A valve member 101 formed with two heads 102 and 103 is normally urged by a spring 104 to seat the head 103 thereof around an orifice 105 connecting the valve chamber 99 to the atmosphere. The diaphragm 97 has an aperture 106 in its centre connecting the valve chambers 98 and 99 one to the other and is urged by a spring 107 away from the valve chamber 99 so that the said aperture 106, which can be closed by the valve head 102, is open. The diaphragm 97 is moved towards the valve chamber 99 by pressure in the motor cylinder 86.

With the system in the condition shown in FIGURE 3, the two chambers of the servo-motor are both connected to the vacuum reservoir 95 and the servo-motor is inoperative, the clutch being engaged. Pressure on the pedal 13 moves the piston 76 of the master cylinder 77 and liquid pressure is built up in the motor cylinders 82 and 86 to take up clearance at the clutch release bearing and displace the valve diaphragm 97, the displacement of the said diaphragm causing the aperture 106 in the diaphragm to be closed and the orifice 105 to be opened by the valve member 101, so that atmospheric air is admitted to the working chamber 94 of the servo-motor. The servo-motor piston 91 is thus moved, and the thrust rod 92 closes the passage 88 in the piston 87 and moves the said piston to create an increased pressure in the servo-operated master cylinder 79 to disengage the clutch. The movement of the piston 87 increases the volume of the space in the master cylinder 79 connected to the master cylinder 77, so that the piston in the valve operating motor cylinder 86 retracts, and the control valve 96 tends to close the orifice 105, the diaphragm 97 being urged in a direction to cause the valve member 101 to close the said orifice by the action thereon of a pressure differential corresponding to that acting in the servo-motor. Since the pedal 13 must therefore be progressively depressed to increase the pressure differential acting in the servo-motor, the said differential is substantially proportional to the pedal movement.

When the pedal 13 is released, pressure in the liquid pressure system is lost and the control valve returns to its normal position, allowing the clutch to re-engage.

In the system shown in FIGURE 4 the servo-motor and control valve are identical with those shown in FIGURE 3, and bear the same reference numerals, but the chamber 93 of the servo-motor is permanently connected at 108 to the atmosphere, and the orifice 105 leading from the valve chamber 99 is connected by a conduit 109 to a compressed air reservoir 110. Thus both chambers 93 and 94 of the servo-motor 89 are normally connected to the atmosphere, and the working chamber 94 is connected to the compressed air reservoir when the control valve 96 is operated by liquid pressure generated in the master cylinder 77. The operation of the system will be obvious from the description associated with FIGURE 3.

Figure 5:
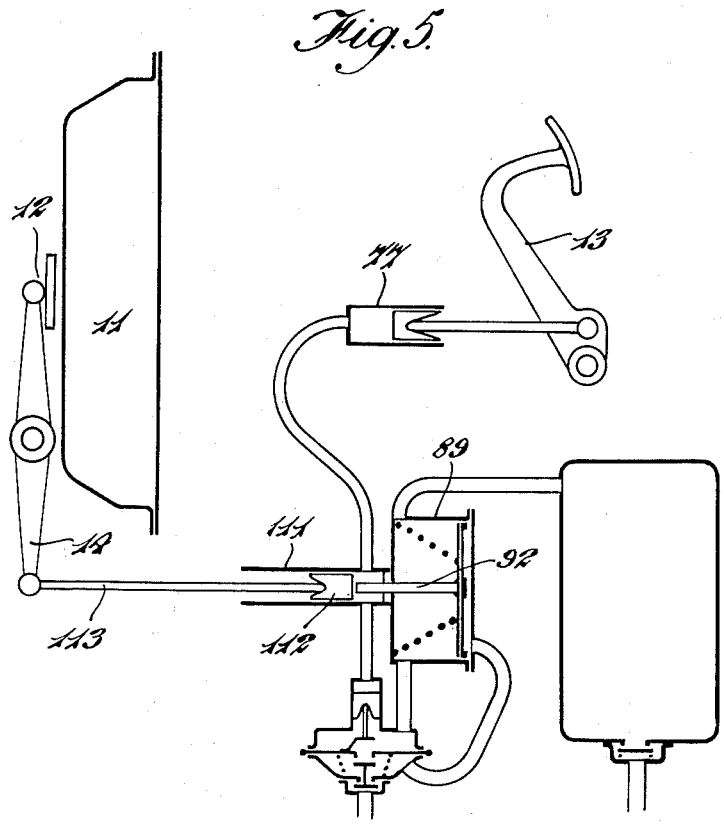
FIGURE 5 shows a clutch control system similar to that shown in FIGURE 3 but having a mechanical connection between the servo-motor and the clutch release bearing.

The clutch control system shown in FIGURE 5 differs from that shown in FIGURE 3 only in that the servo-operated master cylinder 79 is replaced by a cylinder 111 in which is slidable a piston 112 acting on a thrust rod 113 connected to the clutch throw-out lever 14, the piston 112 being movable by liquid pressure generated in the master cylinder 77 and by the thrust rod 92 of the servo-motor 89. The system operates in the same manner as that described with reference to FIGURE 3. The servo-motor may be operated by compressed air as described with reference to FIGURE 4.

Figure 6:
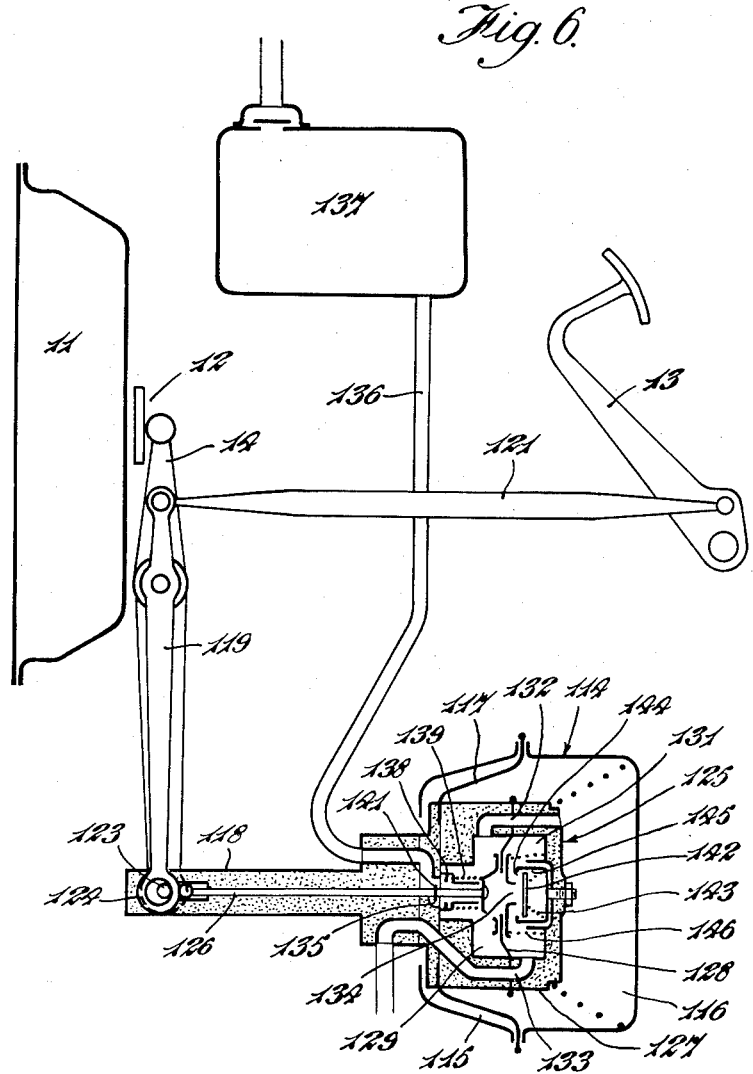
FIGURE 6 shows a clutch control system including a vacuum servo-motor and having a mechanical connection between the clutch operating pedal and the clutch release bearing.

FIGURES 6 and 7 of the drawings show two clutch control systems including a vacuum servo-motor having a control valve mounted inside the servo-motor and operated by relative movement of parts of a direct movement-transmitting connection between the clutch pedal 13 and the clutch release bearing 12.

In these figures, the servo-motor 114 comprises a body divided into two chambers 115 and 116 by a flexible diaphragm 117 to which is rigidly attached a pull rod 118 coupled to the clutch throw-out lever 14. A lever 119, pivoted co-axially with the throw-out lever 14 is connected at one end to the pedal 13, by a thrust link 121 in FIGURE 6 and by a liquid pressure system 122 in FIGURE 7, the other end of the lever 119 having a lost-motion connection with the pull rod 118. The lost motion connection comprises a pin 123 projecting laterally from the pull rod 118 into an eye 124 on the lever 119, the eye being of larger diameter than the pin. A control valve 125 is mounted on the diaphragm 117, and is actuated through a thrust rod 126 by the lever 119.

The control valve 125 comprises a body 127 divided by a flexible diaphragm 128 into two chambers 129 and 131, the chamber 129 being permanently connected by a passage 132 to the chamber 116 of the servo-motor, which is the working chamber, the other chamber 115 of the servo-motor being open to the atmosphere. The other valve chamber 131 is permanently connected to the atmosphere through a passage 133. An aperture 134 in the centre of the valve diaphragm 128 provides communication between the valve chambers 129 and 131, and the valve chamber 129 is connected, through an orifice 135 and a conduit 136, to a vacuum reservoir 137. The thrust rod 126 has slidably mounted on it a valve head 138 urged by a spring 139 towards a stop 141 on the said thrust rod, and the thrust rod is coupled to the diaphragm 128. A closure member 142, urged by a spring 143 towards a stop flange 144 in the mouth of a cup-like member 145 mounted in the valve chamber 131, is provided to control the aperture 134. The valve diaphragm 128 is urged by a spring 146 towards the valve chamber 129.

When the pedal 13 is free, the parts are in the positions shown in FIGURES 6 and 7, the valve diaphragm 128 being held by the spring 146 in a position such that the aperture 134 is open, and the valve head 138 is engaged with the periphery of the orifice 135 to close that orifice, the spring 139 being compressed so that the valve head 138 is spaced from the stop 141. The working chamber 116 of the servo-motor is thus connected to the atmosphere, and the clutch is engaged.

Depression of the pedal 13 moves the lever 119 and the thrust rod 126 to move the centre of the diaphragm until the closure member 145 closes the aperture 134, thus isolating the working chamber 116 of the servo-motor from the atmosphere, and causes the stop 141 to displace the valve head 138 from the periphery of the orifice 135, so that suction is applied to the said working chamber and the servo-motor is operated to disengage the clutch. The servo-motor diaphragm 128 follows the movement of the thrust rod 126, tending to re-close the orifice 135, so that the pressure differential built up in the servo-motor is substantially proportional to the movement of the pedal.

When the pedal is released, the parts are restored to the positions shown in FIGURES 6 and 7, and the clutch is re-engaged.

Figure 8:
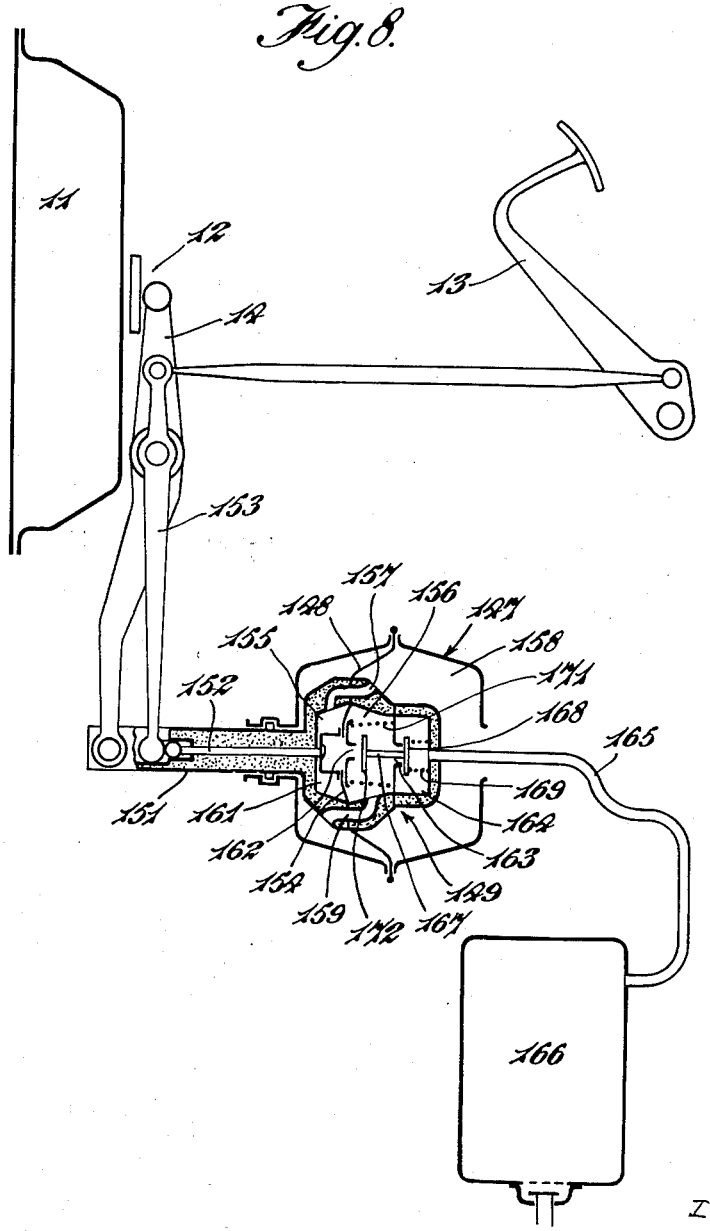
FIGURE 8 shows a clutch control system similar to that shown in FIGURE 6 but including an air pressure servo-motor.

The clutch control system shown in FIGURE 8 is generally similar to that shown in FIGURE 6, but is modified for operation by compressed air. The servo-motor 147 has its diaphragm 148, which carries the control valve 149, coupled by a pull rod 151 to the throw-out lever 14, and the control valve is operated by a push rod 152 through a lever 153 corresponding to the lever 119. The interior of the control valve 149 is divided by a flexible diaphragm 154 into two chambers 155 and 156 the chamber 155 being permanently connected by a passage 157 to the chamber 158 of the servo-motor which is open to the atmosphere, and the chamber 156 being permanently connected by a passage 159 to the working chamber 161 of the servo-motor. An orifice 162 in the valve diaphragm 154 connects the valve chambers 155 and 156 one to the other, and an aperture 163 is formed in a rigid partition dividing the valve chamber 156 from a third valve chamber 164 permanently connected by a conduit 165 to a compressed air reservoir 166.

A valve member 167 is provided to control the orifice 162 and the aperture 163, one head 168 on the said valve member being normally held by a spring 169 in a position to close the aperture 163, whilst the valve diaphragm 154 is urged by a spring 171 away from a second valve head 172 on said valve member, so that the orifice 162 is open, the parts being shown in these positions in FIGURE 8.

When the pedal 13 is depressed, the valve diaphragm 154 is moved to cause the valve head 172 to seat around the orifice 162, the valve member 167 being then moved to open the aperture 163 and admit compressed air to the working chamber of the servo-motor. The servo-motor diaphragm 148 follows up the movement of the push rod 152 as described with reference to FIGURES 6 and 7 and the pressure differential in the servo-motor is similarly dependent on the movement of the clutch pedal 13.

Figure 9:
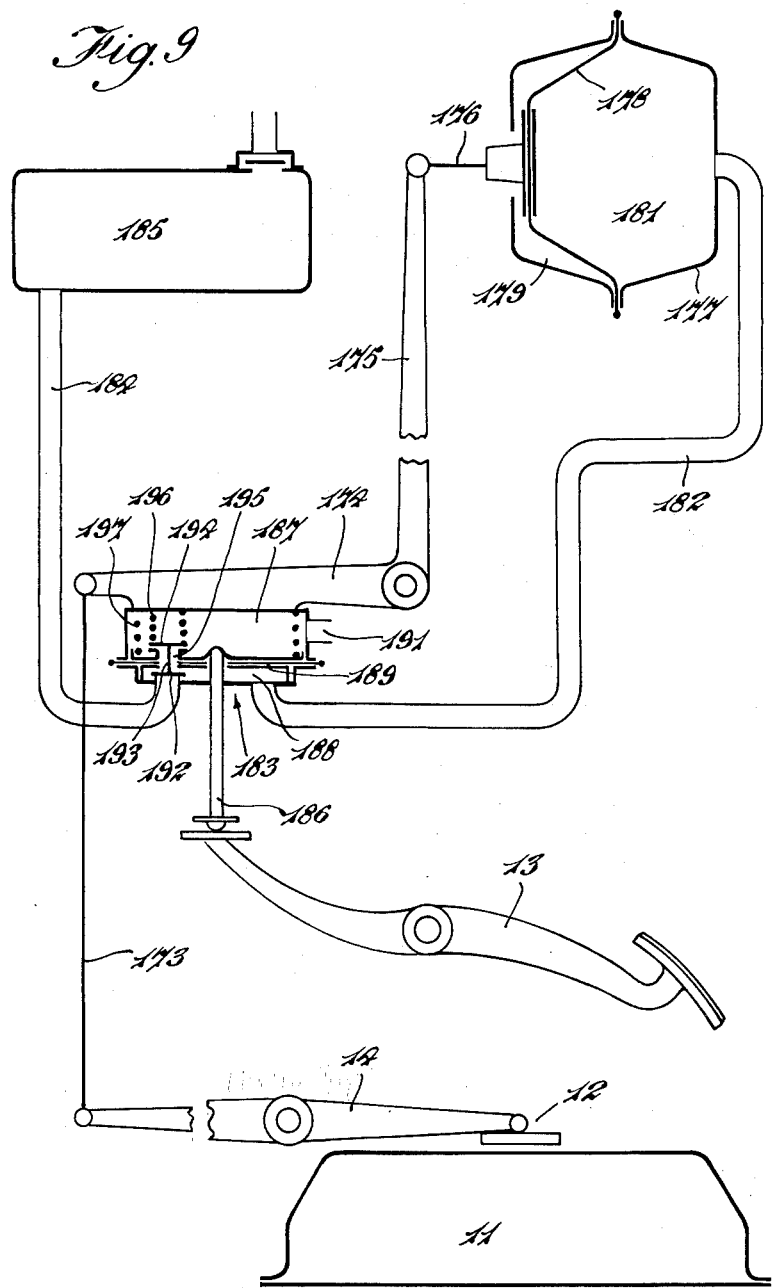
FIGURES 9 and 10 show other clutch control systems including a vacuum servo-motor and having a mechanical connection between the clutch operating pedal and the clutch release bearing.

In the clutch control system shown in FIGURE 9, the throw-out lever 14 is connected by a tension link 173 to one arm 174 of a bell-crank lever, the other arm 175 of which is coupled by a tension link 176 to the movable member of a vacuum servo-motor 177. The servo-motor 177 comprises a casing divided by a flexible diaphragm 178 constituting the said movable member into two chambers 179 and 181. The chamber 179 is open to the atmosphere and the chamber 181, which constitutes the working chamber, is connected by a conduit 182 to a control valve 183 which is also connected, by a conduit 184, to a vacuum reservoir 185. The control valve 183 is mounted on the arm 174 of the bell-crank lever, and is actuated by the clutch pedal 13 through a push rod 186.

The control valve 183 comprises a casing divided into two chambers 187 and 188 by a flexible diaphragm 189, the chamber 187 being permanently connected to the atmosphere at 191 and the chamber 188 being permanently connected to the working chamber 181 of the servo-motor by the conduit 182. The conduit 184 also leads into the valve chamber 188, being normally closed by one head 192 of a double-headed valve member 193 the other head 194 of which controls an aperture 195 in the diaphragm 189. A spring 196 urges the valve head 192 on to a seat around the end of the conduit 184, and a second spring 197 acts on the diaphragm 189 to urge it in such a direction that the aperture 195 is open.

The parts are shown in this position in FIGURE 9, the working chamber 181 of the servo-motor being open to the atmosphere so that the clutch is engaged.

When the pedal 13 is depressed, the valve diaphragm 189 is moved against the resistance of the spring 197, causing the valve head 194 to close the aperture 195 in the diaphragm, and lifting the valve head 192 off its seat, so that suction is applied to the working chamber 181 of the servo-motor, and the clutch is disengaged. The bellcrank lever 174, 175 follows up the movement of the pedal 13, and the pressure differential built up in the servo-motor acts also on the valve diaphragm 189, tending to shut off the conduit 184, so that the pressure differential created in the servo-motor is substantially proportional to the pedal movement. The action of the pressure differential on the valve diaphragm 189 applies to the pedal 13 a reaction proportional to the pull exerted by the servo-motor.

Figure 10:
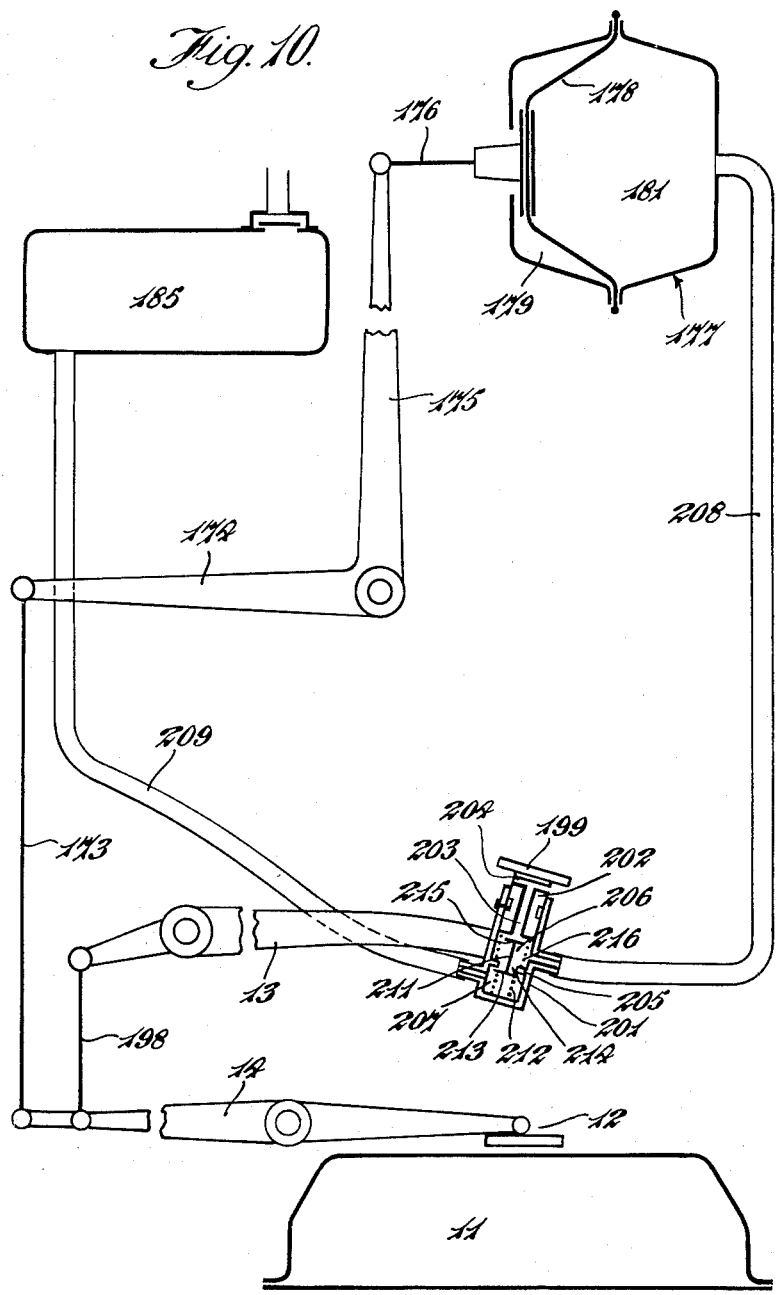

In the clutch control system shown in FIGURE 10, the servo-motor and its connection to the clutch throw-out lever 14 are the same as in FIGURE 9, the parts bearing the same reference numerals, but the pedal 13 is directly connected by a tension link 198 to the throw-out lever 14, and the body of the control valve for the servo-motor is mounted on the pedal 13, the valve being operated by a pedal pad 199 movable relative to the pedal. The body of the control valve 201 is formed with a cylindrical bore in which is slidable a plunger 202 carrying the pedal pad 199, the plunger being bored axially to form a passage 203 connected by a transverse passage 204 to the atmosphere. A rigid partition 205 divides the valve body bore into two chambers 206 and 207, the chamber 206, which is bounded at one end by the plunger 202, being permanently connected by a conduit 208 to the working chamber 181 of the servo-motor 177, and the other chamber 207 being permanently connected by a conduit 209 to the vacuum reservoir 185. A double-headed valve member 211, urged by a spring 212 towards the plunger 202 has one head 213 to control an aperture 214 in the partition 205, and another head 215 to control the passage 203. The plunger 202 is urged away from the partition 205 by a spring 216. When the pedal pad 199 is unloaded, the valve head 213 closes the aperture 214 and the passage 203 is open, so that the working chamber 181 of the servo-motor is in communication with the atmosphere. Depression of the pedal pad 199 moves the plunger 202, causing the passage 203 to be closed by the valve head 215 and causing the aperture 214 to be opened so that suction is applied to the working chamber 181 of the servo-motor to disengage the clutch. Since actuation of the servo-motor causes the pedal 13 to follow up the movement of the pedal pad, tending to re-close the aperture 214, the pressure differential in the servo-motor increases as the pedal is depressed, and is substantially proportional to the pedal movement.

In the control systems shown in FIGURES 9 and 10, stops (not shown) are provided to limit the relative movement of the parts of the control valve so that the clutch may be disengaged directly by pressure exerted on the pedal if the servo-motor is inoperative.

We claim:

1. A control system for a spring loaded friction clutch comprising clutch actuating linkage, a servo-motor including a casing and a fluid pressure shiftable member dividing said casing into two chambers, means connecting said shiftable member to said linkage, said casing having an opening exposing one of said chambers to the atmosphere, a vacuum source, a vacuum line extending between said vacuum source and the other of said chambers, and a valve in said vacuum line controlling the energization and degree of actuation of said servo-motor, said valve including a body closed at one end and having a piston closing the other end thereof, a partition in said body dividing said body into a normally closed chamber and a normally vented chamber, said partition having an opening therethrough for communicating said closed chamber and said vented chamber, that portion of said vacuum line connected to said vacuum source opening into said closed chamber, and that portion of said vacuum line connected to said servo-motor opening into said vented chamber, said piston having a vent opening therethrough, a valve rod extending through said vent opening and said partition opening, means adapted to be actuated by a clutch actuator connected to said piston and said valve rod for moving the same, a first resiliently mounted valve member normally spaced from said piston for engaging said piston to close said vent opening upon movement of said piston, and a second resiliently mounted valve member carried by said valve rod and normally closing said partition opening.

2. The control system of claim 1 wherein said first valve member is slidably mounted on said valve rod and a spring seated on said partition resists movement of said first valve member away from said piston.

3. The control system of claim 1 wherein said second valve member is slidably mounted on said valve rod and a spring carried by said valve rod resists movement of said second valve member away from said partition.

4. The control system of claim 1 wherein said first valve member is slidably mounted on said valve rod and a spring seated on said partition resists movement of said first valve member away from said piston, said second valve member is slidably mounted on said valve rod and a spring carried by said valve rod resists movement of said second valve member away from said partition.

References Cited in the file of this patent

UNITED STATES PATENTS

| | | |
|---|---|---|
| 2,023,674 | Fawick | Dec. 10, 1935 |
| 2,065,980 | Maybach | Dec. 29, 1936 |
| 2,081,238 | Kelley | May 25, 1937 |
| 2,128,165 | Sanford et al. | Aug. 23, 1938 |
| 2,133,275 | Andres et al. | Oct. 18, 1938 |
| 2,141,678 | Andres | Dec. 27, 1938 |
| 2,837,114 | Ruhl | June 3, 1958 |